Feb. 22, 1966    P. S. LITT    3,236,757
METHOD AND APPARATUS FOR RECLAMATION OF WATER
Filed May 11, 1962    2 Sheets-Sheet 1

INVENTOR.
PETER S. LITT
BY
ATT'Y.

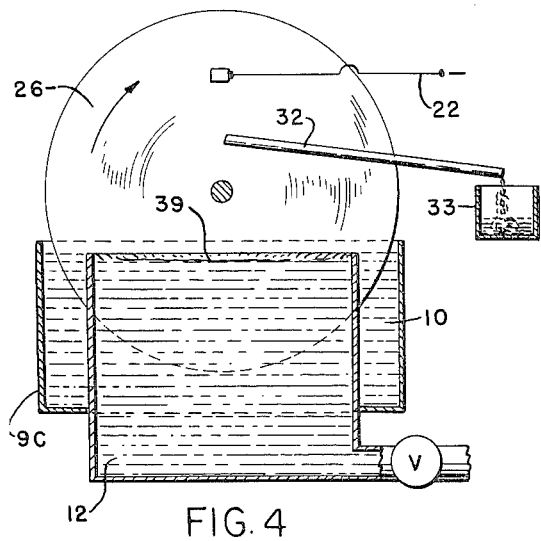
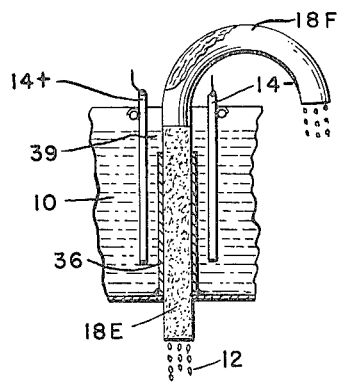
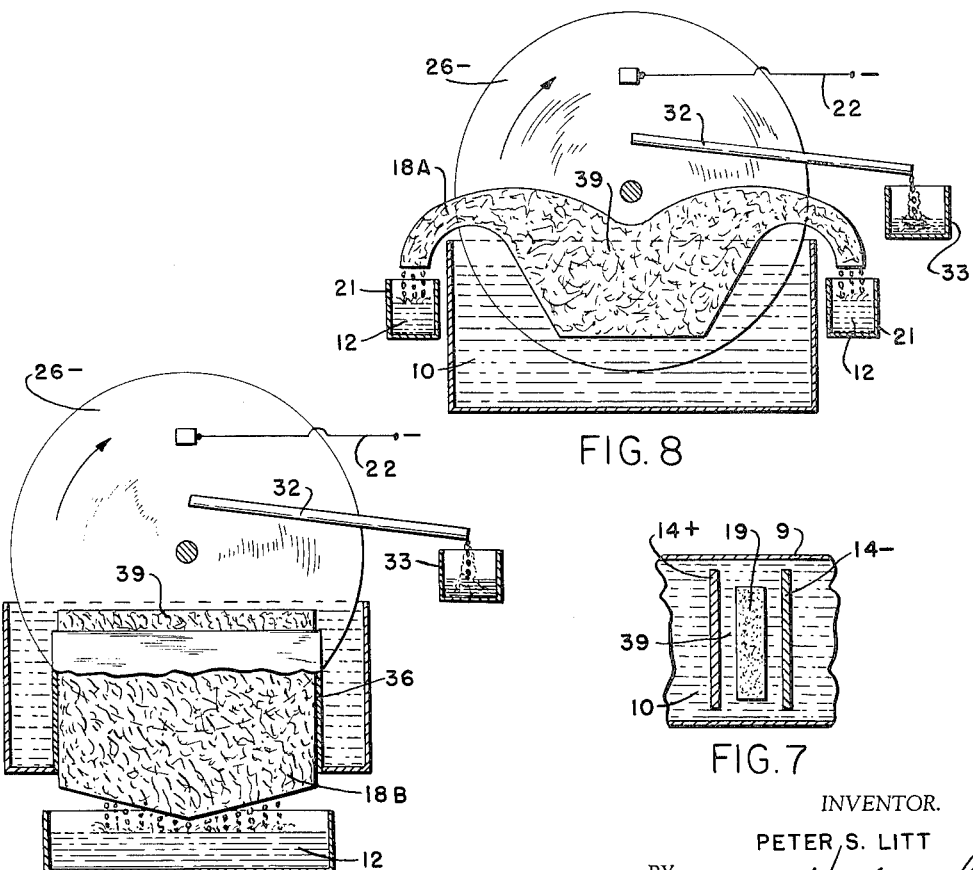

3,236,757
METHOD AND APPARATUS FOR RECLAMATION OF WATER
Peter S. Litt, Albuquerque, N. Mex., assignor of twelve percent each to Walter B. Hobbs, Ralph K. Ball, and Watson D. Harbaugh, all of Evanston, Ill.
Filed May 11, 1962, Ser. No. 193,912
9 Claims. (Cl. 204—149)

The present invention relates to the method and apparatus for reclamation of water from sewage, brackish, stagnant, industrial wastes, sea and alkaline water mixtures along with the generation of useful electrical power.

One of the objects of the present invention is to provide a system which generates electrical power and purifies contaminated water at the same time, which process can be referred to herein as electrical de-ionization of contaminated water.

A further object of the invention is to provide a continuous running water purifying system that can be run at least in part on current generated in the process.

The invention contemplates the movement of ionized particles out of a portion of water contaminated with an ionized compound and collecting from said portion the water remaining.

The invention also contemplates the use, when desired, of inexpensive and readily available additives to assist and accelerate purification and generation of useful electrical energy which additives are quite safe to users and are readily detected even in small quantities as a telltale, if purification or generation equipment becomes damaged.

The invention also contemplates a process and apparatus which is simple to construct, operate and service and involves the use of equipment materials that are inexpensive, durable and easily handled and repaired.

These being among the objects of the invention, other and further objects will appear with the description of the drawings in which several embodiments of the invention are illustrated schematically for carrying out various phases of the process in which:

FIG. 4 is a schematic view of a further embodiment operative with a minimum of parts;

FIGS. 5 and 6 are schematic views of modified wick systems for several applications;

FIG. 7 is a sectional view taken on line 7—7 in FIG. 1;

FIG. 8 is a sectional view taken on line 8—8 of FIG. 2; and

FIG. 9 is a sectional view taken on line 9—9 of FIG. 3.

Figure 1:
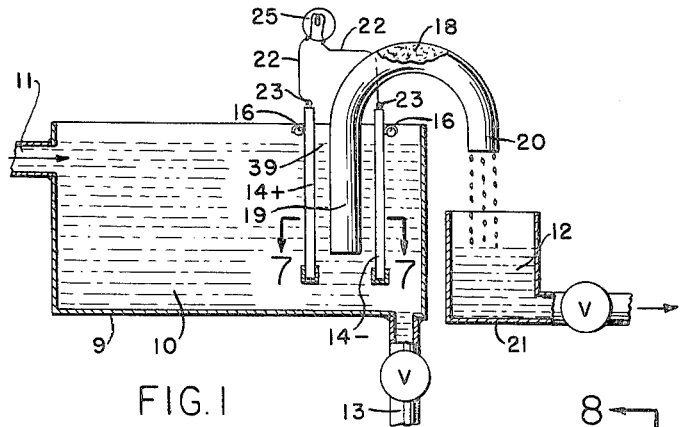
FIG. 1 is a schematic representation of one embodiment of the invention adapted essentially for small installations, homes, ranches and survival equipment, which along with its water purification capacities, same can supply electrical energy useful for lighting or transistor radio operation.

By way of explanation of the invention and its embodiments, reference will be made to an application in which sewage is treated and a product water can be derived that is rated as drinking water along with a generation or conversion of energy to useful electrical power.

It should be noted that all water contaminants other than heavy or gross solids which can be readily removed by mechanical filters can be rated according to their ionization factor in a water solution. Organic wastes do not ionize readily in water while other compounds partially soluble in water such as calcium compounds including calcium hydroxide $CA(OH)_2$ and calcium sulphate $CaSO_4$ not only ionize in water adequately in small quantities, but when ionized also have an affinity for particles of organic materials.

$CaSO_4$ is soluble in water up to 2,500 p.p.m. (parts per million) at certain temperatures and altitudes and to the extent that a solution is attained the compound is disassociated to form in the solution $Ca^{++}$ and $SO_4^{--}$. Any $CaSO_4$ that may be present that is in excess of that which is in solution does not disassociate, but remains in suspension without ionization.

Where organic materials are present in the solution, it is desirable to add $CaSO_4$ in an amount adequate to provide ultimately an ionization factor or influence for all of the particles of organic materials that may be present. Then when intimate contact is established between the ionized particles and the dissolved organic particles, the action of the organic material in the process of the invention is controlled by the action of the ionized particles.

A molecule of $H_2O$ will travel as much as 15 times faster than an ionized particle through a liquid and because of this differential product water will separate from the ions and flow at a faster rate than the ions through a wick capable of capillary diffusion.

I have found that when electrodes of opposite polarizing potential are inserted into the solution of contaminated water that already has ions of both charges in it or has them added as just described, the positive ions will move to the negative electrode and the negative ions to the positive electrode to provide a differential electrical charge or voltage potential between the electrodes. Such can be referred to as a cell. The difference in potential as expressed in volts will vary according to the materials of which the electrodes are made, and when the electrodes are connected to an electrical load that is well within the capacity of the cell, the electrodes will supply electricity and the movement and collection of ionized particles on the electrodes continues accordingly to maintain current flow. Thus, the particles subjected to ionization effects can be removed from the portion of the solution that is disposed between the electrodes and then by removal of the electrodes and washing them, the material collected thereon is discarded from the system. The electrodes are then returned to the solution for a repetition of the process. Of course, the water left behind may still be contaminated but is less contaminated than it was before, if considered as whole and further disassociation of $CaSO_4$ can occur if desired.

In my invention, the significant space defined between the electrodes is narrower than it is wide and of substantial depth to provide for the portion of solution therein, a field of confined ionic activity of sizeable cross-sectional area for a reason now to be described which includes the abstraction of purified water from said significant space.

In this connection, without considering any electrical phenomena that may be present, I have found that a wick made of materials capable of capillary diffusion such as fiber glass, nylon, porous elements of inert materials, organic or inorganic, can be used to siphon pure water from a contaminate solution of ionized particles.

A molecule of $H_2O$ will travel as much as 15 times faster than an ionized particle through a liquid and because of this differential product water will separate from the ions and flow at a faster rate than the ions through a wick capable of capillary diffusion. In applications where small amounts of product water are desired on the order of a gallon per day, a small refillable container can be employed. One end of the wick is placed in the container in the solution and the other end is laid over the side of the container where water dripping therefrom can be caught and used. Such a wick in contact with the solution will begin to pass pure water by capillary diffusion through the wick to the other end ahead of the movement of ionized particles present in the wick. In brief, pure water will travel faster through the wick than ions. Without anything else being done, the recovery of pure water will continue until the ions begin to come through and also drip from the wick. The wick of course can then be removed, purged and returned to its original position to repeat the operation, and, the capacity to produce purified water is proportional to the cross-sectional area of the wick. A compact wick one inch in diameter immersed two inches in contact with the impure water mixtures and having six inches depending portion on the drip side will produce 60 cc. of potable water in an hour.

However, by disposing the wick between the electrodes and keeping the wick within the field of confined ionic activity where the wick contacts the surface of the water and extends a little distance therebelow, the ionized particles are moved from the solution around the wick by movement induced by the electrodes and also from within the wick below the water line before they can follow the pure water that is being siphoned through the wick by capillary diffusion. Thus, the pure water and the ionized particles are separated for the cooperative accomplishment of two beneficial results, namely reclaiming pure water and producing usable electrical energy whose use assists in the reclamation of the water.

One end of the wick is placed where it extends through the field of confined ionic activity between the electrodes. The other end of the wick is disposed where $H_2O$ will be recovered therefrom.

It only remains to keep the electrodes effectively clean and this can be done by the electrodes being constructed and operated as rotating discs employing doctor blades, or by exchanging fouled electrodes with clean ones from time to time when the electrical output drops below a safe level.

Referring now to the drawings and particularly FIG. 1, a container 9 is shown receiving through inlet 11 a solution 10 of contaminated water to which $CaSO_4$ preferably has been added. A drain for flushing or servicing the container is shown at 13, and the reclaimed water that is being extracted is indicated at 12.

Electrodes 14, preferably flat, are disposed in face-to-face spaced relation as supported upon rods or brackets 16, an electrode of positive potential being indicated at 14+ and one of a negative potential at 14−. Supported between them and within the horizontal cross-sectional area defined by the electrodes 14 is disposed the lower end 19 of a wick element 18. This wick may be made of porous or fibrous material, or both, or other materials and structure that are capable of conduction of water by capillary diffusion. The other end 20 of the wick extends to a point as close nearby as possible from whence the reclaimed water 12 may be collected in a container 21 and used.

The electrodes 14 are connected by leads 22 from suitable binding posts 23 to a device such as a light bulb 25 that utilizes approximately one-half of the electrical amperage output of the electrical cell defined by the electrodes so that an adequate voltage drop for sustained ion activity can be maintained. Generally, the cell can be expected to provide from 1 to 3 volts D.C. with a 2 amp capacity. Additional cells may be provided and connected in series or parallel to provide any ultimate voltage and current desired.

In this embodiment the electrodes are changed each time the electrical current flow falls below a factor selected for water purity. The change would occur more often than otherwise, in order to provide a laboratory grade of water.

Figure 2:
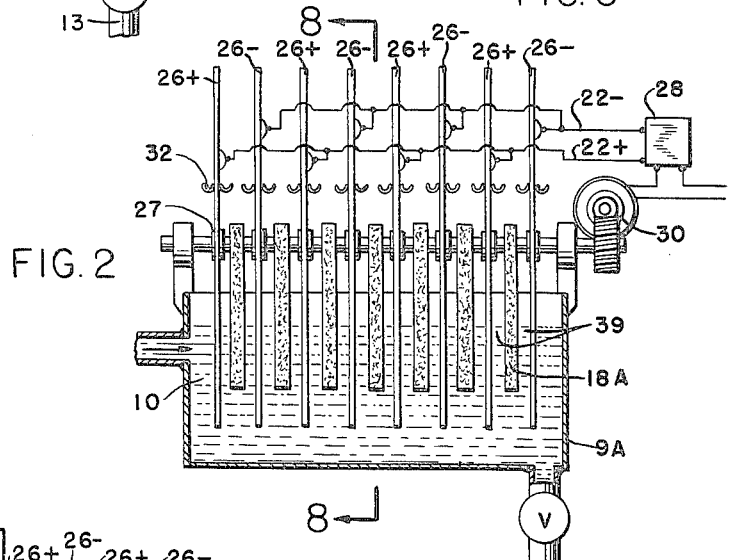
FIG. 2 is a view similar to FIG. 1 in which the water purification and generation of electrical D.C. energy can be accomplished as a continuous automatic process.

In FIG. 2, the electrodes are shown as slowly rotating discs 26+ and 26− insulated from each other at 27 and provided with the wicks 18a split and shaped to conduct water laterally from between the electrodes and over the side of the container 9a. The electrodes 26 are connected to an electronic control 28 which governs the speed of the motor 30 to move the electrode discs more rapidly when a current potential drop occurs indicating that ionic collection on electrodes fouls the electrode.

The doctor blades are shown at 32 where they engage, clean both sides of each electrode and discharge to a trough 33, it being appreciated that the electrodes attract ionic particles from all around the area of contact with the solution.

Figure 3:
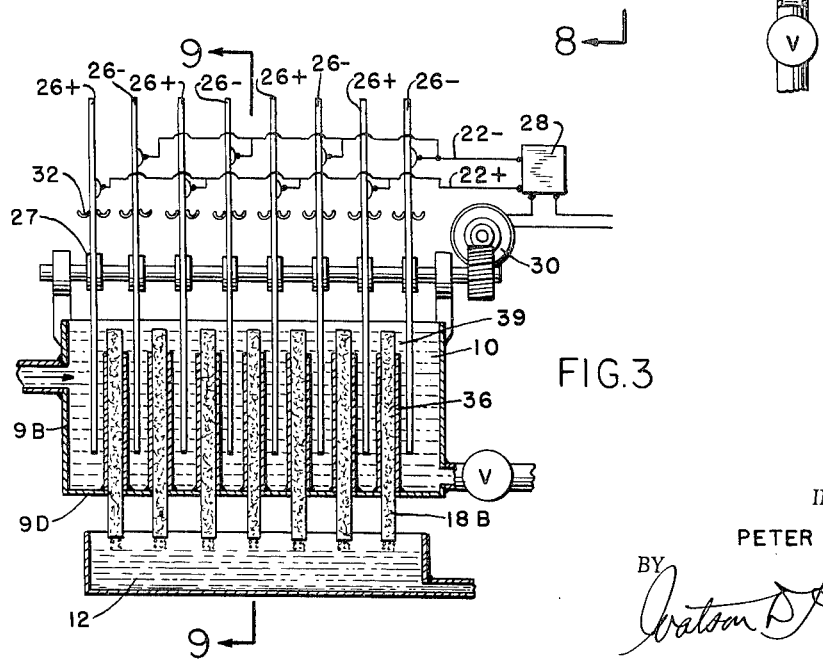
FIG. 3 is a schematic view of a modification of the embodiment shown in FIG. 2.

In FIG. 3, the wicks 18b are arranged a little differently in that they extend up through the bottom 9d of the container 9b where they are supported by tubes 36 that shield and seal them from the solution 10 except where they are exposed within the confined fields of ionic activity between the electrodes 26+ and 26−. Thus, pure water 12 can be conducted downwardly by gravity as well as by capillary diffusion from the confined field of ionic activity at 39 from which ionized particles have been removed by the electrodes. The wick 18b controls the water flow sufficiently for the activity of the electrodes to be effective to purify the water that is entering the wicks.

In FIG. 4 the wicks of FIG. 3 are removed and pure water is permitted to flow from the confined field of ionic activity 39 quietly at a predetermined rate as the electrodes 26 are rotated and connected in series or parallel to provide electrical power for useful work. The only power needed is that required to overcome the drag of doctor blades that may be present. If the electrodes 26 were to be flushed off by water they could be turned by the flushing water like a paddle wheel or in part by the power generated by the electrodes.

Although lead (Pb) and lead peroxide ($PbO_2$) which have an external difference of potential between themselves and the solution have worked quite successfully as electrode material for electrodes 14 and 26, the use of lead or lead compounds for electrodes in contact with drinking water is contrary to health regulations in certain states because of possible lead poisoning. Therefore, where the product water extracted might be taken internally it is desirable to employ electrode pairs of other materials such as certain antimony alloys, particularly aluminum antimonides and carbon or silver; silver oxide and silver or nickel; or, vanadium and tantalum or tungsten. The selection of these materials depends on non-toxicity, non-corrosion in slurries associated generally with contaminated water, price of material and the voltaic output of slurries or solutions having calcium compounds therein.

Other wick or pure water flow control members can be made of porous gypsum or the like, provided the porous gypsum is short and the water is transferred from the porous gypsum material to an inert felt-like wick for low p.p.m. product water. Porous gypsum wicks can be used full length for irrigation water where 2,500 p.p.m. of gypsum in product water is considered desirable as a mineral supplement in soils.

Figure 5:
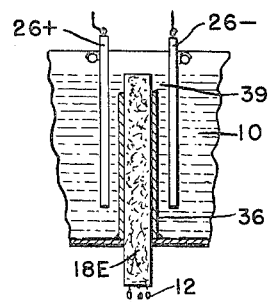

For instance, in FIG. 5 a modification of the wick 18b shown in FIG. 3 is shown at 18e made of plaster paris and perlite granules to provide an inert material of controlled porosity in which the porosity may be graduated from fine to heavy in the direction of flow of water therethrough. Such is an inexpensive and readily replaceable element for use in irrigation systems where any calcium picked up by the water passing the full length of the wick serves advantageously as a mineral supplement.

In FIG. 6, an embodiment is shown in which two different grades of water may be reclaimed with the embodiments shown in FIG. 1 or 2 combined with FIG. 3. A wick 18f similar in construction to either of the wicks 18 or 18a is placed in contact with the top end of the wick 18e (FIG. 5) whereby potable water is derived by capillary diffusion from the wick portion 18f through contact with the top of wick portion 18e and irrigation water of higher flow volume will be derived through the wick portion 18e along with the generation of electricity.

In some respects we are not able to account fully for the improved results which are obtained by the method and apparatus of this invention, and it should be understood that any attempt to analyze the theory which is believed to be responsible for these results is to be construed not as defining a mode of operation, but merely as a possible explanation of certain physical, electrical, or chemical phenomena which have been observed.

Having thus described the invention and various embodiments thereof it will be appreciated by those skilled in the art how the objects and operation of the invention set forth herein are fulfilled and accomplished and how various and further embodiments and modifications can be made including by reference, those of my co-filed application, Serial No. 194,135, now abandoned without departing from the spirit of the invention, the scope of which is commensurate with the appended claims.

What is claimed is:

1. The process of purifying a solution contaminated with ionic particles comprising
creating by the flow of electrical current through a quiescent portion of the solution a field of confined ionic activity,
progressively withdrawing and collecting ionic particles from said field of confined ionic activity and removing said collected ionic particles physically from the solution,
simultaneously extracting water from said field of confined ionic activity by capillary action through a wick in which water molecules flow with diffusion more rapidly than ionic particles, and
discharging said water molecules from the wick ahead of said ionic particles at a point removed from said field of confined ionic activity.

2. The process of purifying a solution contaminated with ionic particles of opposite electrical charges comprising
progressively de-ionizing a quiescent portion of the solution with the flow of electrical current having opposite effective polarity within said quiescent portion to create a field of confined ionic activity,
simultaneously extracting water from said de-ionized field of confined ionic activity by capillary action through a wick in which water molecules flow with diffusion more rapidly than ions in the extracted water, and
discharging said water molecules from the wick at a point removed from said field of confined ionic activity.

3. The process of purifying a solution of contaminated water having dissolved organic particles in it comprising
disassociating a compound in the solution into electrically charged ionic particles in intimate contact with the organic particles to provide a resultant solution in which the movement of the organic particles are controlled by movement of the ionic particles therein,
progressively de-ionizing a quiescent portion of the resultant solution with a flow of electrical current creating a field of confined ionic activity therein,
simultaneously extracting water from said field of confined ionic activity by capillary action through a wick to flow water molecules with diffusion more rapidly therethrough than the ionic particles in the extracted water, and
collecting said water molecules from the wick ahead of ionic particles at a point removed from said field of confined ionic activity.

4. The process of purifying a solution of ionically contaminated water comprising
progressively reducing the ionic content of a quiescent portion of a solution with the flow of electrical current creating a field of confined ionic activity therein, simultaneously withdrawing contaminated water of reduced ionic content from said field of confined ionic activity,
moving said withdrawn water from said field through a wick in which water molecules flow by diffusion more rapidly than the ions in the withdrawn water, and
discharging water molecules ahead of ions in the withdrawn water at a point removed from said field of confined ionic activity.

5. In an apparatus for purifying a solution of water contaminated with ionized particles, the combination of,
a container having a body of feed water therein contaminated with ionized particles,
an electrical circuit including two spaced electrically conductive elements carrying a current of electricity disposed in said feed water in said container and providing a field of confined ionic activity in said feed water between them,
a wick member for conducting water by capillary action in which water molecules flow with diffusion more rapidly through the wick than ionized particles in the water therein,
said wick having a portion thereof in contact with the water within said field of confined ionic activity to withdraw water from within said field by capillary action and another portion extending above and then below the level of said water within said field to a point remote from said field where water molecules of the withdrawn water are recovered ahead of ionized particles,
said field of confined ionic activity being effective in reducing the ionized particles flowing through the wick.

6. The combination called for in claim 5 in which said electrically conductive elements are electrodes of opposite polarity upon which ionized particles collect from said field of confined ionic activity.

7. The combination called for in claim 6 in which said electrodes comprise rotating elements moving progressively through said body of feed water, and
means disposed remote from said field of confined ionic activity for removing the ionized particles collected on the electrodes.

8. In an apparatus for purifying a solution of water contaminated with ionized particles, the combination of
a container having a body of feed water therein contaminated with ionized particles of both charges,
two spaced elements in an electrical circuit charged electrically with opposite polarity disposed in said feed water in said container and providing a field of confined ionic activity in said feed water between them to reduce the ionic content of the feed water in said field,
a wick compacted to conduct water by capillary action in which water molecules flow therethrough with diffusion more rapidly than ionized particles therein,
said wick having a portion thereof in contact with the water within said field of confined ionic activity to withdraw water from within said field by capillary action and another portion extending above and then below the level of said water within said field to a point remote from said field where water molecules of the withdrawn water are recovered ahead of the ionized particles,
said confined ionic activity being effective in reducing the ions entering the wick.

9. In an apparatus for purifying a solution of water contaminated with ionized particles, the combination of
a container having a body of feed water therein contaminated with ionized particles of both charges,
an electrical circuit including two spaced elements disposed in the body of feed water in said container carrying a current of electricity and having opposite polarities to provide a de-ionizing field of confined ionic activity in said body of feed water, a wick disposed in and receiving water from said field of confined ionic activity and extending to a point above and then below the level of said water with said field, to retard the flow and collect ionized particles therein while passing water molecules therethrough, means for moving said spaced elements with respect to said wick and said field of confined ionic activity to remove collected ionic particles therefrom and discharge them at a point remote from said field of confined ionic activity and means for collecting water molecules passing through said wick element at a point removed from said field of confined ionic activity.

References Cited by the Examiner

UNITED STATES PATENTS

| | | | |
|---|---|---|---|
| 495,242 | 4/1893 | Cabell | 204—150 |
| 1,102,769 | 7/1914 | Lincoln | 204—275 |
| 1,222,637 | 4/1917 | Landreth | 204—150 |
| 1,746,964 | 2/1930 | Polatsik | 204—149 |
| 2,158,595 | 5/1939 | Slagle | 204—151 |
| 2,318,919 | 5/1943 | Brockman | 204—149 |
| 2,358,981 | 9/1944 | Lattner | 204—197 |
| 2,555,487 | 6/1951 | Haugaard et al. | 204—180 |
| 2,566,308 | 9/1951 | Brewer | 204—1 |
| 2,839,463 | 6/1958 | Vellas et al. | 204—149 |
| 2,852,453 | 9/1958 | Hansner | 204—151 |
| 2,879,217 | 3/1959 | Durrum et al. | 204—299 |
| 2,944,952 | 7/1960 | McMinn | 204—300 |

FOREIGN PATENTS

| | | |
|---|---|---|
| 97,694 | 8/1924 | Austria. |
| 482,141 | 3/1938 | Great Britain. |
| 716,875 | 10/1954 | Great Britain. |

OTHER REFERENCES

Mantell: "Electrochemical Engineering," 4th ed., 1960, pp. 133–135.

JOHN H. MACK, *Primary Examiner.*

JOHN R. SPECK, WINSTON A. DOUGLAS,
*Examiners.*